No. 664,056. T. J. MAY. Patented Dec. 18, 1900.
COCKROACH TRAP.
(Application filed July 8, 1899.)

(No Model.)

WITNESSES,
K. M. Imboden
M. L. Lange

INVENTOR,
Thos. J. May.
BY HIS ATT'YS,
Higdon & Higdon.

UNITED STATES PATENT OFFICE.

THOMAS J. MAY, OF KANSAS CITY, MISSOURI.

COCKROACH-TRAP.

SPECIFICATION forming part of Letters Patent No. 664,056, dated December 18, 1900.

Application filed July 8, 1899. Serial No. 723,227. (No model.)

*To all whom it may concern:*

Be it known that I, THOMAS J. MAY, a citizen of the United States, residing at Kansas City, in the county of Jackson and State of Missouri, have invented a new and useful Cockroach-Trap, of which the following is a specification, reference being had to the accompanying drawings, forming part thereof.

My invention relates to insect-traps, and more especially to traps for cockroaches and such vermin.

Figure 1:
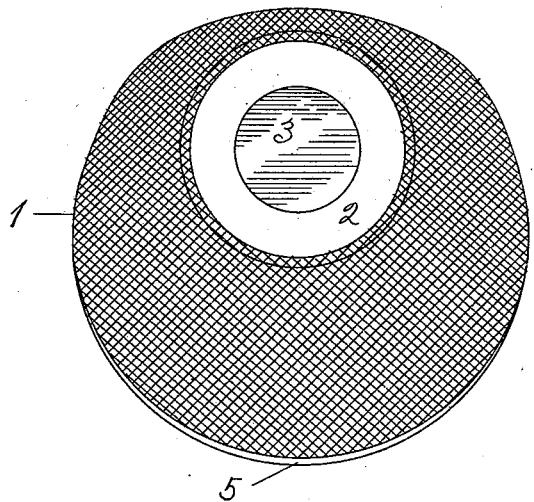
Figure 2:
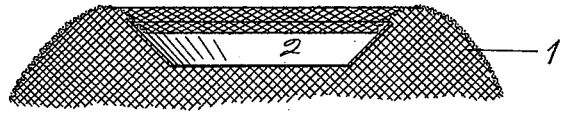
Figure 3:

In the drawings, Figure 1 represents the trap in perspective. Fig. 2 is a central vertical section through the collar and the adjacent edge of the body of the trap. Fig. 3 is a central diametrical section of the plate which forms the bottom of the trap.

The trap comprises three portions—the body 1, the annular hopper-shaped portion 2, and the circular base-plate 3. The body 1 is made from a foraminous material, such as wire-netting, and has approximately the form of a truncated cone open at its top and bottom. The interstices of said material are large enough to permit the vermin to see the bait within. The lower circular edge of the material of which the body 1 is formed is secured in any suitable manner to a sheet-metal ring 5. The collar 2, having gently-inclined sides, as shown in Fig. 3, is secured in any suitable manner at its upper edge to the inner surface of the lip of the upper opening of said body 1. (See Fig. 2.) Said lip or edge of said opening is formed inwardly and then downwardly in order to overlap the collar 2, for the purpose hereinafter stated. Said collar is made of smooth sheet metal or other hard smooth material. The bottom plate 3 of the trap is provided at or near its outer edge with a continuous annular crimp or groove 4, as shown in Fig. 3. When the trap is set, the lower edge of the ring 5 rests in this groove 4, but is not permanently secured therein. The body 1 may thus be readily removed when it is desired to place the bait in the trap or to remove dead vermin after killing them by immersing the trap in hot water.

The greatest point of superiority possessed by my trap is the fact that a portion of the netting or body of the trap is extended inwardly a short distance past the ridge or highest portion thereof. The effect of this construction is that the insect having reached this high ridge finds a secure foothold downward toward the entrance of the trap. He does not observe the collar 2 until his fore feet strike it, and then he cannot check himself. He slips on the smooth surface and falls into the trap. In other traps of this type the vermin encounter a smooth surface as soon as they reach the highest portion of the trap, and this makes them hesitate to attempt the descent inside. The smooth surface of the collar 2 makes it impossible for the vermin to escape from my trap.

Having described my invention, I claim as new and desire to secure by Letters Patent of the United States—

An insect-trap comprising a marginally-grooved base-plate, a body or cage of foraminous material, open at its top, and having its lower edge fitting within said marginal groove, the edge of said upper opening being curled inwardly and downwardly; and a hopper-shaped collar formed of hard smooth material, the upper edge of said collar underlying and secured to the inwardly-curled edge of said upper opening in the body of the trap, substantially as described.

THOMAS J. MAY.

Witnesses:
JOHN B. HILL,
ELISHA F. ROGERS.